No. 716,989. Patented Dec. 30, 1902.
J. A. DAVIDSON.
FILTER.
(Application filed Sept. 19, 1902.)
(No Model.)
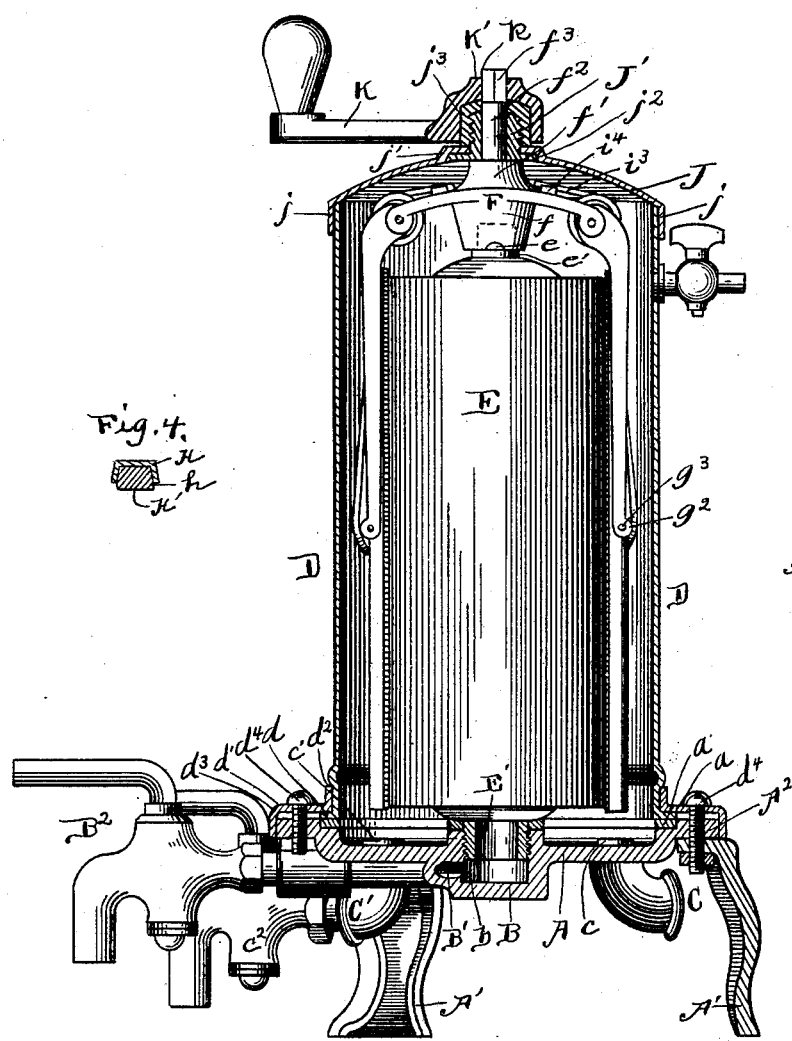
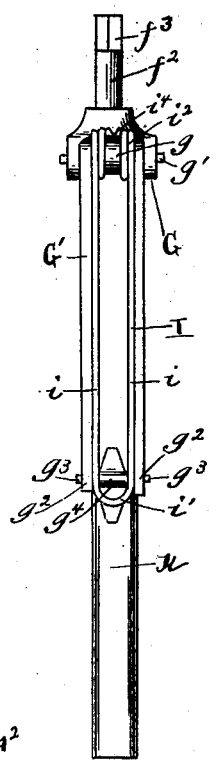
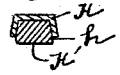
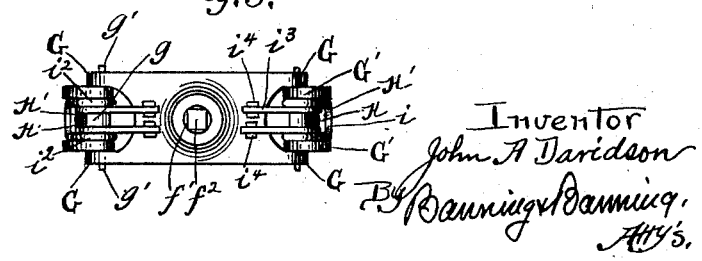

UNITED STATES PATENT OFFICE.

JOHN A. DAVIDSON, OF CHICAGO, ILLINOIS, ASSIGNOR TO NATIONAL FILTER COMPANY, OF CHICAGO, ILLINOIS.

FILTER.

SPECIFICATION forming part of Letters Patent No. 716,989, dated December 30, 1902.

Application filed September 19, 1902. Serial No. 124,096. (No model.)

*To all whom it may concern:*

Be it known that I, JOHN A. DAVIDSON, a citizen of the United States, residing at Chicago, in the county of Cook and State of Illinois, have invented a certain new and useful Improvement in Filters, of which the following is a specification.

The object of this invention is to construct a filter employing a filtering-stone which may be readily cleaned by the rotation of suitable mechanism without the necessity for taking apart the filter and scouring the stone and at the same time arranging said mechanism so that the abrasive or scouring material shall bear uniformly against the outer face of the stone at all times, thereby insuring a uniform cleansing or scouring of the stone for the purpose of removing the sediment and other impurities and deleterious matter collected thereon, which matter may be easily and readily carried off from the filter-tank after being removed from the filtering-stone by flushing, thereby thoroughly cleansing the filter and enabling it to perfectly perform its work.

The invention, moreover, relates to the cleaning or scouring mechanism, which may be employed with filters of other than the specific construction hereinafter described; and it consists in the features of construction and combination of parts hereinafter described and claimed.

In the drawings, Figure 1 is an elevation of the filter, showing the tank in section and the filtering-stone and scouring mechanism in elevation; Fig. 2, a side view of the scouring mechanism; Fig. 3, a top view of the same, and Fig. 4 a cross-sectional view of the frame or casing containing the abrasive material.

As shown, the filter is constructed with a base or bottom A, supported on legs A' and provided with an annular flange $A^2$ and a circumferential recess or ledge $a$ in its upper face, having therein a strip of packing material $a'$ for the purpose of sealing the filter shell or tank when brought in contact with the base or bottom. In the center of the base or bottom is formed a chamber B, having on its inner face screw-threads $b$ for the attachment thereto of the stone and further provided with an outlet passage or pipe B', provided at its end with a faucet $B^2$, as usual, for the withdrawal of the filtered water from the interior of the stone. An inlet-pipe C, having a mouth $c$, leads through the base or bottom into the interior of the filter, and an outlet-pipe C', entering the filter at the point $c'$ and provided with a faucet $c^2$, serves to withdraw the water from the filter-tank without first passing it through the stone, which withdrawal is necessary in flushing the filter in order to carry off the sediment and other matter which has been collected and scoured from the stone by the action of the cleaning or scouring mechanism.

The tank or shell of the filter consists of a cylinder D, provided at its lower rim with an outwardly-turned circumferential flange $d$, which flange contacts with the packing carried by the base or bottom and firmly seals the shell or casing thereto, and thereby prevents the escape of water and enables the joint to withstand the pressure necessary to force the water through the stone. The cylinder is locked or fastened to the base or bottom by means of an annular rim $d'$, provided with an upwardly-turned collar $d^2$ for contact with the outer face of the cylinder and provided with a downwardly-turned collar or flange $d^3$, which encircles the edge of the base or bottom plate to which the entire rim is attached by means of screw-bolts $d^4$.

As shown, the stone E is of cylindrical shape and is attached and securely held in place by means of a hollow plug E', screw-threaded on its exterior, to which the stone is secured in any suitable manner, which plug communicates with the interior of the stone and is screw-threaded into the chamber in the bottom or base of the cylinder, thus establishing communication between the interior of the stone and the faucet for withdrawing the filtered water for use, although other means of securing the stone may be employed. From the top of the stone extends a pivotal stud $e$, having at its base a bearing-collar $e'$, and said stud extends up into the recessed boss $f$ of the cross-head F for supporting and pivotally mounting the scouring or cleaning mechanism, which latter principally forms the subject-matter of the present invention. This cross-head is provided on its upper face with a tapering stud $f$, to the upper face of which is fixedly attached a pivotal shaft $f^2$, having at its free end a squared head $f^3$ for the reception of a handle thereon. The cross-head is provided at its ends with ears G, and between the ears are mounted sleeves $g$, pivoted to the ears by means of pivot-pins $g'$, and to the sleeves are attached, to rest within the ears, downwardly-depending arms G', provided at their free ends with heads $g^2$ for the passage therethrough of pivotal pins $g^3$, which latter extend through sleeves $g^4$ on the external faces of trough-shaped frames H for containing therein the abrasive material, and the cross-head supporting the frames is of suitable dimensions to allow the frames to lie in parallel relation to the external face of the stone. Moreover, the frames being pivoted to the depending arms, which are themselves pivoted to the cross-head, the space between the two frames may be varied considerably without changing the parallel relation of the frames to each other. Within the frames are strips H' of abrasive material, such as corundum or emery, although other substances may be likewise employed. The abrasive material is arranged to project beyond the edges of the frame in which it is contained, so that the scouring-surfaces will always be presented to the exterior face of the stone, and, moreover, the pivotal action of the frames enables the abrasive surface to pass over inequalities in the stone without interfering with the action of the abrasive material. In order to hold the abrasive material carried by the two frames into firm contact with the stone, springs I, two in number, are provided to bear against the frames carrying the abrasive material, and these springs are constructed with side arms $i$ and a yoke $i'$, and the side arms are turned to form loops or coils $i^2$ around the sleeves pivoted to the ears on the cross-head. The free ends of the arms composing the springs are carried back toward the center of the cross-head and are secured against lateral displacement between lugs $i^4$ on the upper face of the cross-head. This arrangement is one which prevents the displacement of the springs at any point, since they are adapted to lie within the depending side arms which support the frame and are held in place by the passage therethrough of the pivoted sleeves and are of sufficient rigidity to exert a strong inward pressure at all times on the frames carrying the abrasive material.

The cylinder composing the body of the filter-casing is closed at its upper end by means of a cap or cover J, provided with a downwardly-turned rim $j$ for attachment to the cylinder composing the body of the filter-casing. The cap or cover is provided in its center with a recess $j'$ for the reception therein of a hollow screw-threaded plug J', having a flange $j^2$, adapted to lie within the recess in the cover, to which it is secured by brazing, soldering, or other suitable means. The plug is further secured in place by means of a hollow screw-threaded nut $j^3$, which fits down over the plug and contacts with the outer face of the recessed portion of the cap or cover, and a handle K, having a head K', adapted to fit down over the hollow nut, is provided with a squared hole or recess $k$, adapted to fit onto the squared head which connects with the cross-head supporting the scouring mechanism and rotate the entire mechanism, thereby causing the abrasive material to scour the stone and clean the same.

The action of the scouring mechanism will be partially understood from the foregoing description, but may be briefly stated as follows: When it is desirable to clear the sediment and other matter from the stone after the same has collected thereon, the scouring mechanism is revolved by means of the handle, causing the emery, corundum, or other scouring material to pass transversely over the surface of the filtering-stone held under a pressure thereon by means of the springs contacting with the frames carrying the abrasive material. These frames are so pivoted as to adapt themselves under pressure to the inequalities of the stone and at the same time exert a continuous abrasive action thereon. Moreover, as the stone is worn away by the continued action of the abrasive material the latter will be forced by the springs acting on the frames into continued contact with the stone, and the pivotal arrangement of the side arms supporting the frames will enable the latter to maintain their parallel relation irrespective of their distance from one another.

What I regard as new, and desire to secure by Letters Patent, is—

1. In combination with a filter employing a stone, strips of abrasive material held under pressure into contact with the stone, frames supporting the abrasive material, arms to which the frames are pivotally attached, a head supporting the arms, and means for revolving the head and the arms attached thereto, substantially as described.

2. In combination with a filter employing a stone, strips of abrasive material held under pressure in contact with the stone, frames supporting the abrasive material, arms to which the frames are pivotally attached, a cross-head to which the arms are pivotally attached, and means for rotating the head and the arms attached thereto, substantially as described.

3. In combination with a filter employing a stone, strips of abrasive material held under pressure in contact with the stone, frames supporting the abrasive material, arms to which the frames are pivotally attached, a cross-head to which the arms are pivotally attached, springs exerting an inward pressure on the frames, and means for rotating the head and the arms attached thereto, substantially as described.

4. In combination with a filter employing a stone, strips of abrasive material held under pressure in contact with the stone, trough-shaped frames containing the abrasive material, depending arms to which the trough-shaped frames are pivotally attached, a cross-head pivotally supported on the stone to which the depending arms are pivotally attached, springs exerting an inward pressure on the trough-shaped frames, and means for supporting the arms depending therefrom, substantially as described.

5. In combination with a filter employing a stone, strips of abrasive material held under pressure in contact with the stone, trough-shaped frames inclosing the strips of abrasive material, depending arms to the ends of which the trough-shaped frames are pivotally attached, a cross-head pivotally mounted above the stone provided with ears between which the depending arms are pivotally mounted, a sleeve between the arms, depending springs provided with loops or coils encircling the sleeves between the side arms, a post extending upwardly from the cross-head, and means for imparting rotation through the post to the cross-head and the arms depending therefrom, substantially as described.

JOHN A. DAVIDSON.

Witnesses:
THOMAS A. BANNING,
WALKER BANNING.